(12) United States Patent
Cavalin et al.

(10) Patent No.: US 9,942,472 B2
(45) Date of Patent: Apr. 10, 2018

(54) METHOD AND SYSTEM FOR REAL-TIME IMAGE SUBJECTIVE SOCIAL CONTENTMENT MAXIMIZATION

(71) Applicant: INTERNATIONAL BUSINESS MACHINES CORPORATION, Armonk, NY (US)

(72) Inventors: Paulo R. Cavalin, Rio de Janeiro (BR); Bruno Flach, Rio de Janeiro (BR); Carlos R. Mendes, Rio de Janeiro (BR); Luis G. Moyano, Rio de Janeiro (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 194 days.

(21) Appl. No.: 14/953,095

(22) Filed: Nov. 27, 2015

(65) Prior Publication Data

US 2017/0155833 A1    Jun. 1, 2017

(51) Int. Cl.
*H04N 5/232* (2006.01)
*G06T 7/00* (2017.01)

(52) U.S. Cl.
CPC ....... *H04N 5/23222* (2013.01); *G06T 7/0002* (2013.01); *H04N 5/23219* (2013.01); *H04N 5/23229* (2013.01); *H04N 5/23293* (2013.01); *G06T 2207/10004* (2013.01); *G06T 2207/20076* (2013.01); *G06T 2207/20081* (2013.01); *G06T 2207/30201* (2013.01)

(58) Field of Classification Search
CPC ........... H04N 5/23206; H04N 5/23219; H04N 5/23222; H04N 5/23229; G06T 7/0002; G06T 2207/20081
See application file for complete search history.

(56) References Cited

U.S. PATENT DOCUMENTS

| | | | |
|---|---|---|---|
| 7,239,350 B2 * | 7/2007 | Ban | H04N 5/23222 348/231.3 |
| 7,362,354 B2 | 4/2008 | Lin | |
| 8,311,364 B2 | 11/2012 | Cerosaletti et al. | |
| 8,330,826 B2 | 12/2012 | Cerosaletti et al. | |
| 8,502,879 B2 | 8/2013 | De Leon et al. | |
| 8,660,342 B2 | 2/2014 | Obrador et al. | |
| 8,781,175 B2 | 7/2014 | Wang et al. | |

(Continued)

FOREIGN PATENT DOCUMENTS

WO    WO 2014/064690    5/2014

OTHER PUBLICATIONS

Luca Marchesotti, et al., "Assessing the Aesthetic Quality of Photographs Using Generic Images Descriptors," 2011, IEEE International Conference on Computer Vision, pp. 1784-1791.

*Primary Examiner* — Daniel M Pasiewicz
(74) *Attorney, Agent, or Firm* — F. Chau & Associates, LLC

(57) ABSTRACT

A photographing method including: displaying, at an image acquisition device, a scene that includes a first person; displaying, at the image acquisition device, a first score in the scene, wherein the first score is indicative of the first person's contentment with the way he or she looks in the scene; and acquiring, at the image acquisition device, a photograph of the scene when the first score is equal to or greater than a threshold value.

15 Claims, 7 Drawing Sheets

(56) References Cited

U.S. PATENT DOCUMENTS

| | | | |
|---|---|---|---|
| 2007/0019081 A1* | 1/2007 | Nakashima | H04N 1/2112 348/231.99 |
| 2008/0192129 A1* | 8/2008 | Walker | G11B 27/034 348/231.2 |
| 2009/0066803 A1* | 3/2009 | Miyata | H04N 5/232 348/222.1 |
| 2012/0013783 A1* | 1/2012 | Asami | H04N 5/23206 348/333.02 |
| 2013/0128090 A1* | 5/2013 | Choi | H04N 5/23293 348/333.02 |
| 2013/0142418 A1* | 6/2013 | van Zwol | G06K 9/00751 382/159 |
| 2014/0072221 A1* | 3/2014 | Sakai | H04N 5/23222 382/173 |
| 2014/0328536 A1* | 11/2014 | Whitehill | G06K 9/00221 382/159 |
| 2015/0229838 A1* | 8/2015 | Hakim | H04N 5/23293 348/333.02 |
| 2015/0288874 A1* | 10/2015 | Sivan | H04N 5/23222 348/207.11 |

* cited by examiner

METHOD AND SYSTEM FOR REAL-TIME IMAGE SUBJECTIVE SOCIAL CONTENTMENT MAXIMIZATION

1. TECHNICAL FIELD

The present invention relates to the assessment of picture quality.

2. DISCUSSION OF THE RELATED ART

Registering important moments and events through pictures (e.g., photos) is an activity that is part of the routine of an increasingly large portion of the population. Today, to carry a device with the capability of taking pictures (e.g., smartphones, tablets, digital cameras, etc.) is a reality for many people.

A common situation that happens after a picture is taken is checking the quality of the image. However, in many situations, quality is very subjective and related to personal preferences. For example, people tend to evaluate how they look like in the resulting image after a picture is taken. Even if focus, illumination, resolution and all other basic image-quality features are good, his/her personal evaluation of himself/herself in the picture is finally what tells if a picture is good or not. When more than one person appears in the image, the aesthetic quality of an image is the combination of their personal opinions. In a real-world scenario, either the picture should be re-taken over and over again until everyone is happy with the quality of the image, or they must just accept the current image.

BRIEF SUMMARY

In an exemplary embodiment of the present invention, there is provided a photographing method including: displaying, at an image acquisition device, a scene that includes a first person; displaying, at the image acquisition device, a first score in the scene, wherein the first score is indicative of the first person's contentment with the way he or she looks in the scene; and acquiring, at the image acquisition device, a photograph of the scene when the first score is equal to or greater than a threshold value.

The method may further include: identifying, at the image acquisition device, the first person in the scene; receiving, at the image acquisition device, a trained model for the first person; and determining, at the image acquisition device, the first score using the trained model for the first person.

The trained model may be wirelessly received by the image acquisition device.

The first score may be a machine learning prediction.

The method may further include: identifying, at the image acquisition device, the first person in the scene with the image acquisition device; and receiving, at the image acquisition device, the first score obtained using a trained model for the first person.

When the scene includes a second person, the method may further include: displaying, at the image acquisition device, a second score in the scene, wherein the second score is indicative of the second person's contentment with the way he or she looks in the scene; and acquiring, at the image acquisition device, the photograph of the scene when the first and second scores are equal to or greater than a threshold value.

The method may further include: identifying, at the image acquisition device, the second person in the scene; receiving, at the image acquisition device, a trained model for the second person; and determining, at the image acquisition device, the second score using the trained model for the second person.

The image acquisition device may include an image sensor.

In an exemplary embodiment of the present invention, there is provided a method of providing image quality scores when a picture is going to be taken with a camera, the method including: displaying, on a screen of a photographing device, an image of a scene including a plurality of people; identifying, with the photographing device, the identity of each person in the scene; retrieving, from a database, an image quality prediction model for each person in the scene; computing, at the photographing device, a score for each person in the scene, wherein the score for each person is computed using their image quality predication model and the score for each person is indicative of the first person's level of satisfaction with the way he or she looks in the scene; and taking, with the photographing device, a picture of the scene when the scores are determined to be high enough according to a user.

An image quality prediction model for a person may be built by: extracting information from at least one social network for the person, wherein the information includes pictures of the person; assigning scores to the pictures of the person, wherein the scores are assigned by the person and are indicative of their subjective contentment of himself or herself in the picture; and applying a supervised machine learning algorithm to the scored pictures to learn a scoring function for the person.

The screen of the photographing device may be a viewfinder of a camera.

The photographing device may be a smartphone or a tablet computer.

At least one of the person's score may be adjusted based on a repositioning of the corresponding person in the scene.

The score may be increased or decreased when the person repositions himself or herself.

The picture may be taken after the at least one person's score has been adjusted.

The scores may be determined to be high enough when each of the scores exceeds a threshold value determined by the user.

The scores may be determined to be high enough when a threshold number of the scores exceeds a threshold value, wherein the threshold number and the threshold value are set by the user.

In an exemplary embodiment of the present invention, there is provided a photographing method including: displaying, at an image acquisition device, a scene that includes a first element; displaying, at the image acquisition device, a first score in the scene, wherein the first score is indicative of an aesthetic quality level of the first element in the scene; and acquiring, at the image acquisition device, a photograph of the scene when the first score is equal to or greater than a threshold value.

The first element may be a physical object.

The first score may be based on a model determinative of the aesthetic quality level of the first element.

DETAILED DESCRIPTION

An exemplary embodiment of the present invention provides a method to facilitate the maximization of people's contentment on pictures before a picture is actually taken by using information gathered from social networks, guaranteeing that everyone will be happy with himself or herself in the final image.

For example, the present invention provides in real-time a quality score for an image display in a camera (or any similar device). For doing so, the system uses information from social networks and image quality prediction models tailored for the personal preferences of each user in the social network.

The prediction model is built in the following way. First, a people's (or user's) database is built, for instance by extracting information from social networks, containing mainly personal information (e.g., gender, connections with other people, etc.) and a set of personal pictures. This dataset of personal pictures allows for each person to provide a way for the user to assign scores (or classes) for each image according with his/her subjective contentment of himself/herself on the referred picture. With this labeled database of people's pictures, supervised machine learning algorithms can be applied to learn scoring (or classification) functions for each person, and in the sequence, the resulting model can be used to predict the score (or classification) regarding his/her personal contentment of new input images.

The predicted models can then be used to display quality scores in real-time, when a picture is going to be taken with a camera (or any similar device) that is connected to the system. When one or more than one person appear in the image, the system recovers and combines the prediction models of all people identified in the picture. This allows for a better positioning and people's orientation in order to maximize the social contentment of the final image when capturing a new image.

The present invention is composed of two main phases: training and prediction. The training phase runs "offline" and is responsible for the training of the scoring functions, while the prediction phase runs "online" (in real-time) at the moment that one is focusing to take a picture. Next, we describe in detail the data and the algorithms used in each phase.

Figure 1:
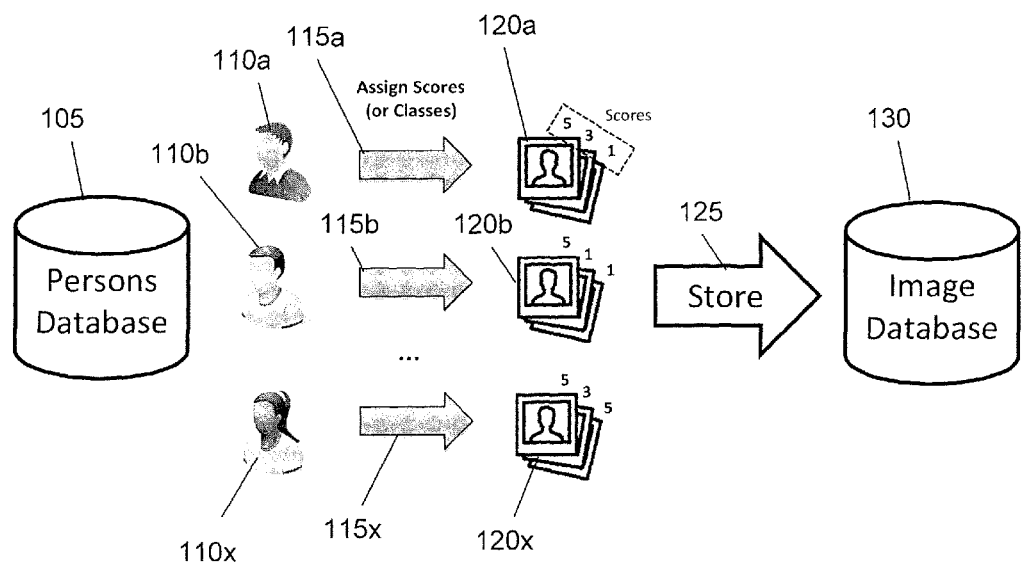
FIGS. 1 and 2 illustrate a training phase according to an exemplary embodiment of the present invention.
Figure 2:
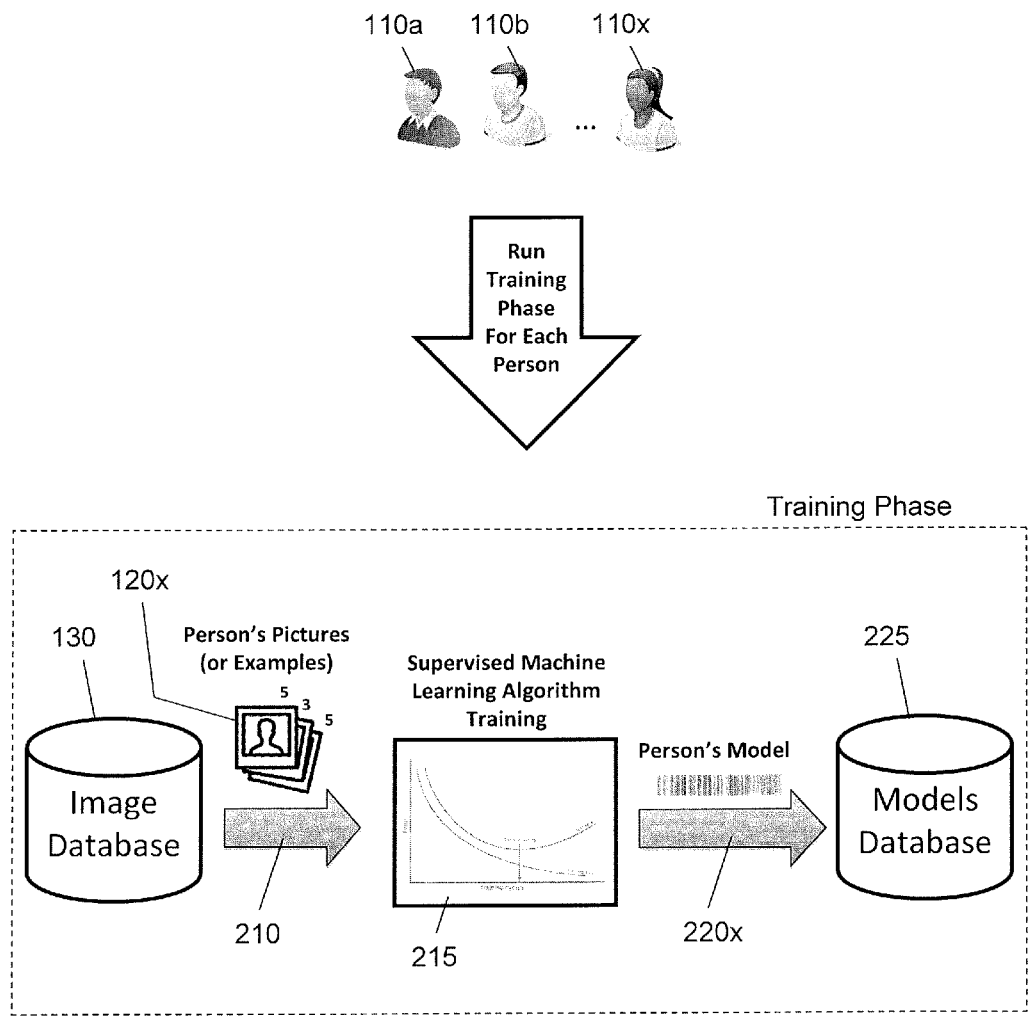

FIGS. 1 and 2 illustrate a training phase according to an exemplary embodiment of the present invention. More particularly, FIG. 1 illustrates building an image database according to an exemplary embodiment of the present invention, and FIG. 2 illustrates performing the training phase by using the image database.

As shown in FIG. 1, there is provided a persons database 105. The persons database 105 may constitute, for example, information gathered from social networks about people. Examples of the social networks may include facebook, instagram and flickr. The information gathered may include personal information about these people. For example, the personal information may include an individual's gender as well as a list of their friends. The information gathered may also include pictures of these people. The process of gathering information for the database 105 may be performed under control of and by a computer connected to the internet.

Each person 110a, 110b . . . 110x included in the database 105 may assign scores (or classes) to images of himself or herself in their photographs. As an example, a person 110a may view his or her photos on a personal computing device such as a laptop or smartphone. These photos may be shown to the person 110a in a list format as provided from the computer on which the database 105 is stored. At this time, the person 110a may assign a score indicative of his or her subjective contentment of himself or herself in a particular image.

For example, if the person 110a thinks he or she looks good in an image, he or she may assign a high score such as a 5 to the image. If the person 110a thinks he or she looks just fine or average in the image, he or she may assign a middle score such as a 3 to the image. If the person 110a does not like the way he or she looks in the image, he or she may assign a low score such as a 1 to the image.

It is to be understood that although the aforementioned process of assigning scores to the images is described as being done manually by an individual (or each individual), the present invention is not limited thereto. For example, the scores can be computed automatically by a computer using metadata such as the number of likes given to a particular image. In this case, a high number of likes may result in a high score and a low number of likes may result in a low score.

In FIG. 1, the processes of assigning scores for the persons 110a, 110b . . . 110x are respectively shown by 115a, 115b . . . 115x, and scored photographs for the persons 110a, 110b . . . 110x are respectively shown by 120a, 120b . . . 120x. As further shown in FIG. 1, the scored photographs 120a, 120b . . . 120x are stored in an image database 130. The photographs 120a, 120b . . . 120x are stored such that each person 110a, 110b . . . 110x may have their own labeled image database. Storing of the scored photographs 120a, 120b . . . 120x in the database 130 is represented by 125 in FIG. 1.

Referring now to FIG. 2, for each person 110a, 110b . . . 110x, a supervised machine learning algorithm is trained using their labeled images from the database 130 as input. Supervised learning is the machine learning task of inferring a function from labeled training data. The training data consist of a set of training examples. In supervised learning, each example is a pair consisting of an input object (typically a vector) and a desired output value (also called the supervisory signal). A supervised learning algorithm analyzes the training data and produces an inferred function, which can be used for mapping new examples. An optimal scenario will allow for the algorithm to correctly determine the class labels for unseen instances. This requires the learning algorithm to generalize from the training data to unseen situations in a "reasonable" way.

For example, as shown in the training phase of FIG. 2, the scored photographs 120x of person 110x are input to a supervised machine learning algorithm. This process is represented by numerals 210 and 215 in FIG. 2. The supervised machine learning algorithm is trained using the labeled images for the person 110x as the input examples. The supervised machine learning algorithm may be run on the computer on which the database 130 is stored. As the training result, the algorithm will return a trained model 220x for the person 110x. The trained model 220x learns scoring (or classification) functions for each person based on their labeled input images. The trained model 220x will be stored in a models database 225 and used in a subsequent prediction phase involving the person 110x.

An objective of the training phase described with reference to FIGS. 1 and 2 is to build/maintain an updated database of the trained models per user. For example, the models database 225 of FIG. 2. To accomplish this objective, the training procedure could run periodically for every user that updated his or her image database, or simply every time that a user updates his or her image database (e.g., when they insert or delete images, or change scores).

It is to be understood that although the aforementioned training phase uses labeled images of people as input, other types of input may be employed to create a trained model. For example, images of physical objects such as consumer products or storefront signs may be labeled according to their aesthetic quality. Models corresponding to these physical objects may then be used in a prediction phase as will be discussed hereafter.

Figure 3:
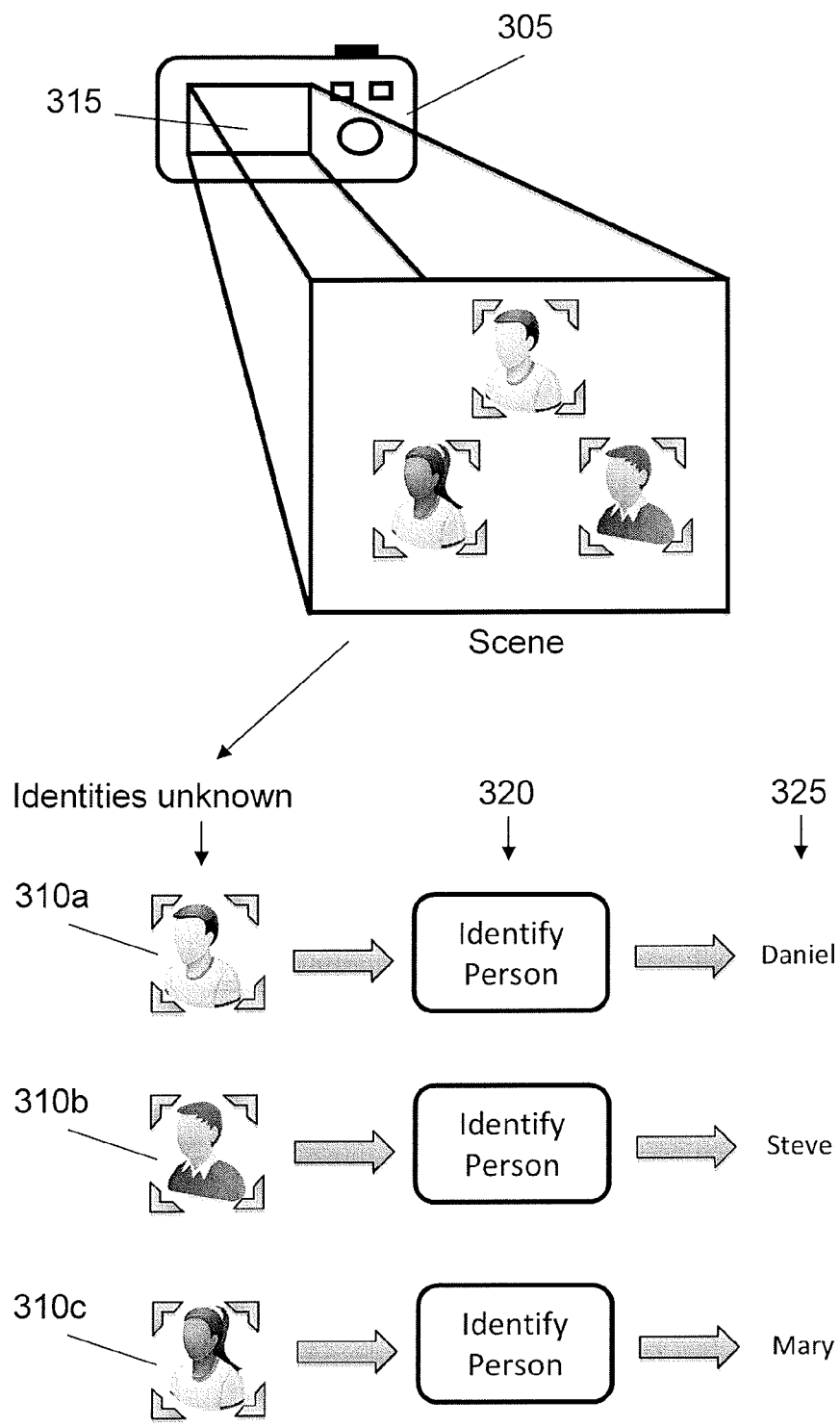
FIGS. 3, 4, 5 and 6 illustrate a prediction phase according to an exemplary embodiment of the present invention.
Figure 4:
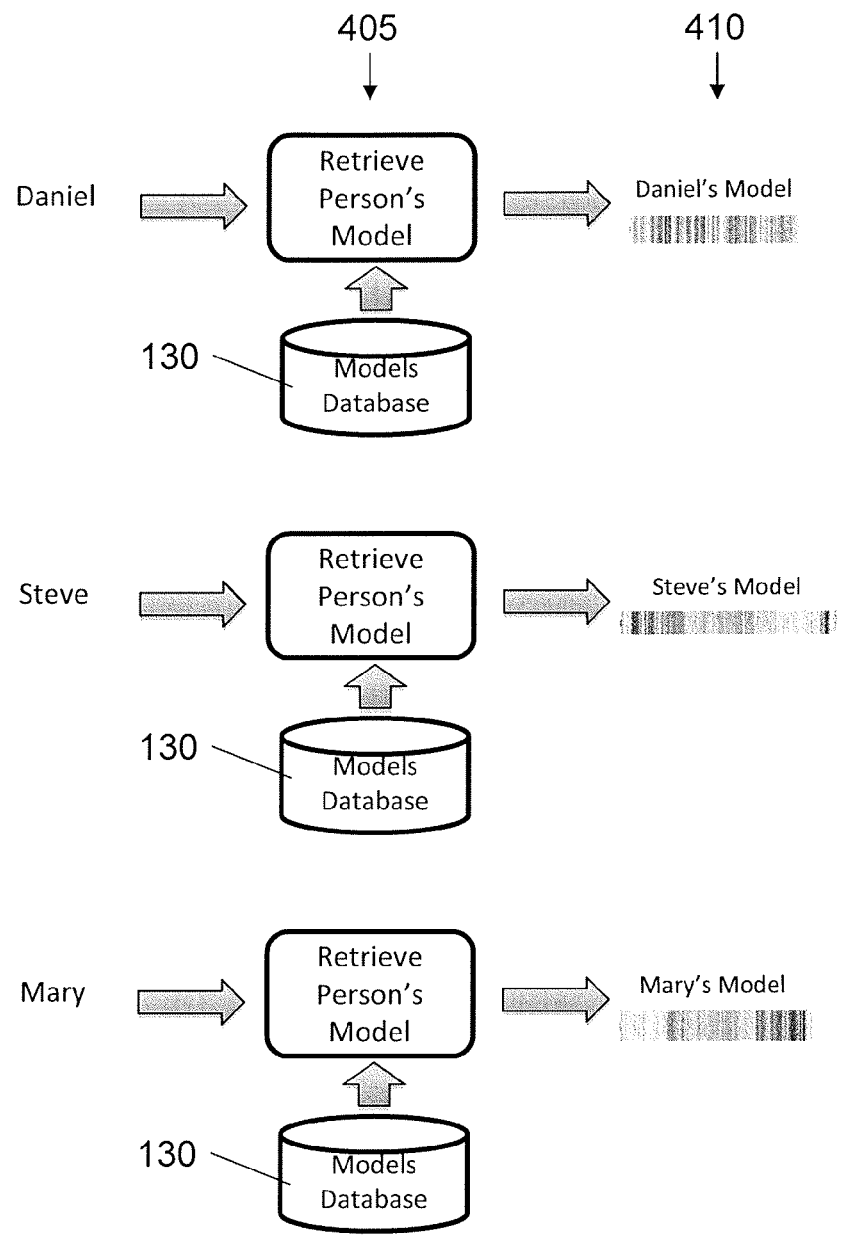
Figure 5:
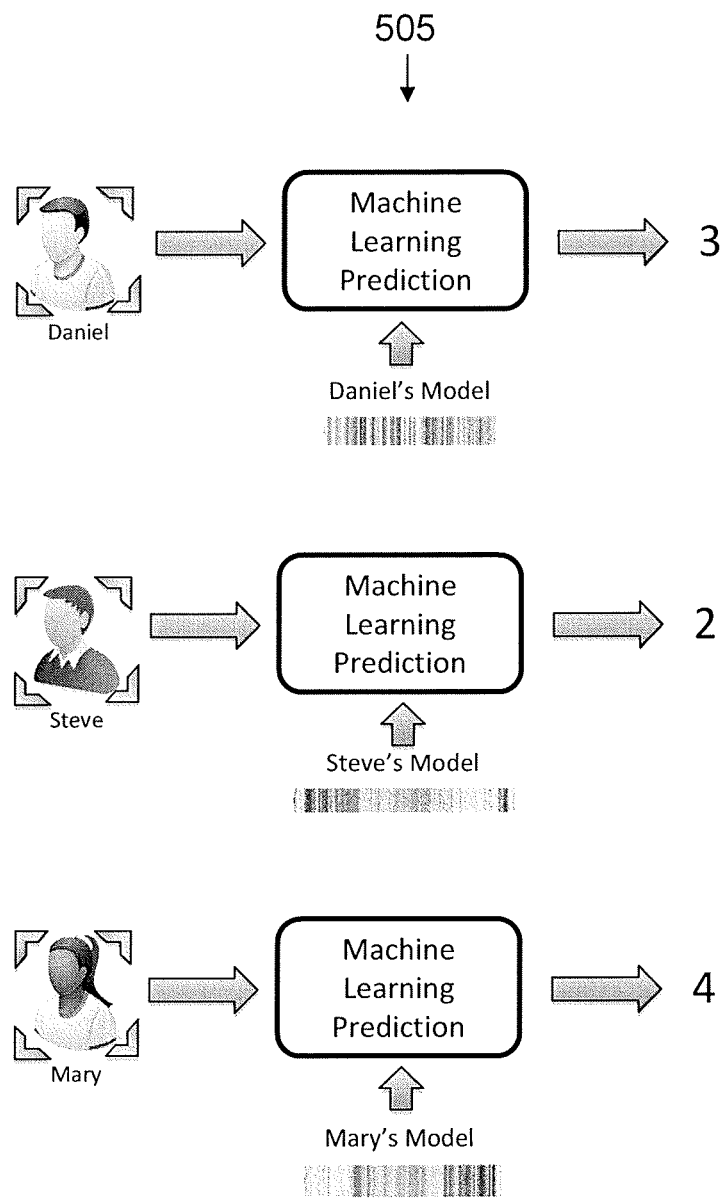
Figure 6:
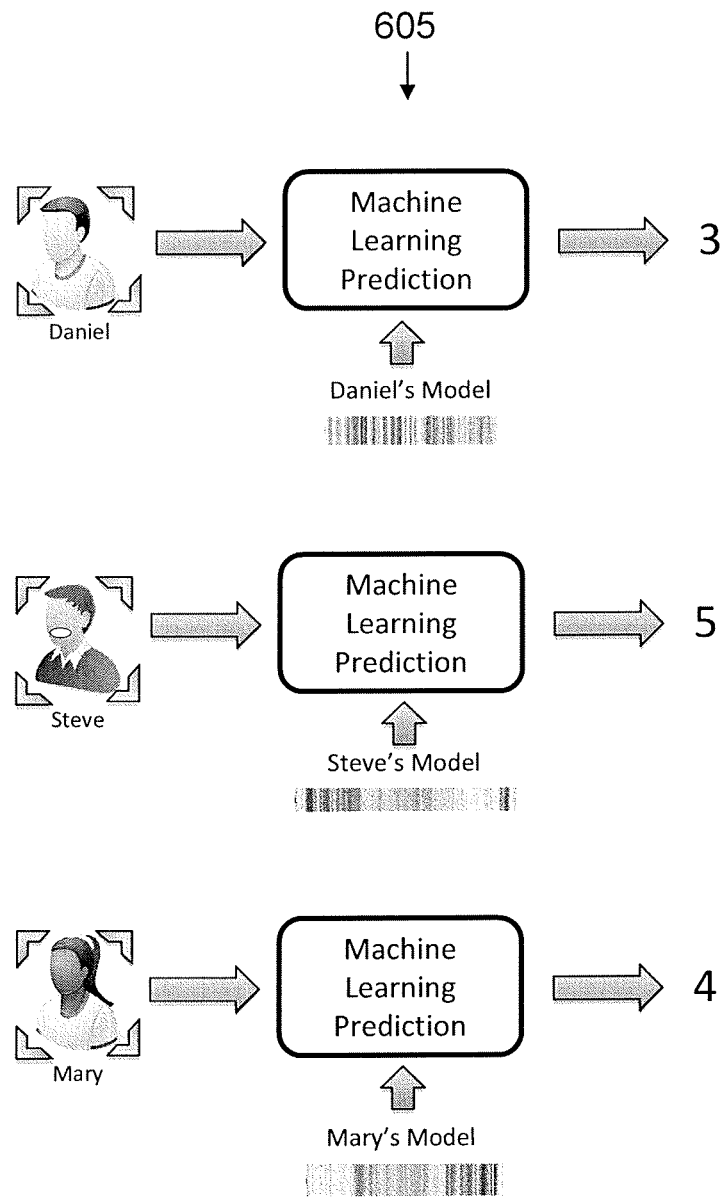

FIGS. 3, 4, 5 and 6 illustrate a prediction phase according to an exemplary embodiment of the present invention. More particularly, FIG. 3 illustrates identifying people in an image according to an exemplary embodiment of the present invention. FIG. 4 illustrates retrieving trained models corresponding to the people in the image according to an exemplary embodiment of the present invention. FIG. 5 illustrates predicting scores using the trained models according to an exemplary embodiment of the present invention. FIG. 6 illustrates predicting scores using the trained models according to an exemplary embodiment of the present invention.

As shown in FIG. 3 there is provided an image acquisition device 305. The image acquisition device 305 may be a digital camera or a device equipped with a digital camera. A device equipped with a digital camera may be, for example, a smartphone, a tablet computer, etc. When a user is focusing to take a picture with the image acquisition device 305, several people 310a, 310b and 310c may appear in a scene being viewed on a display screen 315 of the image acquisition device 305. At this time, the identity of the people 310a, 310b and 310c is unknown. Using facial recognition software, the identity of the people 310a, 310b and 310c is determined. For example, the identity of person 310a may be determined to be Daniel, the identity of person 310b may be determined to be Steve and the identity of the person 310c may be determined to be Mary. This process is illustrated by numerals 320 and 325 in FIG. 3.

The facial recognition software may be run on the image acquisition device 305. The facial recognition software may compare selected facial features from the image and a facial database. The facial database may be present on the image acquisition device 305, or may be remotely accessible by the image acquisition device 305. For example, the facial database may be found on the computer on which the database 130 is stored.

With the identity of the people in the image now determined, the image acquisition device 305 can retrieve the trained model for each person in the image from the models database 130. For example, as shown in FIG. 4, the trained model for Daniel may be retrieved from the models database 130, the trained model for Steve may be retrieved from the models database 130 and the trained model for Mary may be retrieved from the models database 130. This retrieval may be made with a wired or wireless connection between the image acquisition device 305 and the computer on which the database 130 is stored. For example, the trained models may be wirelessly provided to the image acquisition device 305 via the internet. The process of retrieving models is illustrated by numerals 405 and 410 in FIG. 4.

It is to be understood that although the aforementioned example had the image acquisition device 305 requesting a computer/server for the models of a particular person, the models can be stored locally on the image acquisition device 305.

Referring now to FIG. 5, by applying the trained models, there is computed and shown, directly on the screen 315 of the image acquisition device 305, the predicted scores (or classes) of every person in the image. For example, by inputting the current image of Daniel into Daniel's trained model, a machine learning prediction regarding Daniel's personal contentment of himself in the current image gives a score of 3. By inputting the current image of Steve into Steve's trained model, a machine learning prediction regarding Steve's personal contentment of himself in the current image gives of a score of 2. By inputting the current image of Mary into Mary's trained model, a machine learning prediction regarding Mary's personal contentment of herself in the current image gives a score of 4.

The machine learning prediction may take place at the image acquisition device 305. This process is illustrated by numeral 505 in FIG. 5. The scores of 3, 2 and 4 in FIG. 5 may be shown directly on the screen 315 of the image acquisition device 305 next to the current image of the corresponding person. If a user of the image acquisition device 305 believes these scores are high enough, a picture of the current image may be taken. The user of the image acquisition device 305 may also verbally relay the scores to the individuals in the current image. If the individuals in the current image are satisfied with the scores, a picture of the current image may be taken.

On the other hand, the scores may be determined not to be high enough or satisfactory. In this case, the user may request one or more persons in the current image to reposition themselves, make a different facial gesture, etc. At this time, as shown in FIG. 6, the trained models may be applied to the new image to give new scores to each person. For example, as shown in FIG. 6, the new scores may be a 3 for Daniel, a 5 for Steve and a 4 for Mary. The new machine learning process is represented by numeral 605 in FIG. 6. If the new scores are deemed satisfactory by the user or the persons in the new image, a picture of the new image may be taken. If the new scores are still not good enough, one or more of the persons may be asked to move, smile again, etc. and another picture may be taken.

It is to be understood that in the above description the decision to take a photo was based on the subjective decision of the photographer or the people in the image. However, this decision making process may be done automatically. For example, the image acquisition device 105 itself may determine to take a picture when all of the scores are equal to or above a threshold value. For example, if all of the scores are a 3 or higher, the photo may be automatically taken. Further, the image acquisition device 105 may inform the persons in the image to reposition themselves, change their facial gestures, etc. before the picture is taken. Such indication may be via a red blinking light that turns to green when the scores are at or above a threshold value.

As can be gleaned from the above description of the exemplary embodiments of the present invention, when a photograph is about to be taken, a score indicative of a person's contentment with the way he or she looks in a scene are displayed directly on the screen of an image acquisition device in real-time. Depending on the score, a photograph of the scene may be taken. This way, the person's contentment with the way he or she looks can be maximized before the photograph is actually taken.

It is to be understood that a similar scheme can be used when the system considers other types of objects. For instance, if the system considers computers and cars as objects, content models previously built on training data containing the best user-defined images of computers and cars are used to access the best position, angles, distances from the camera, etc., to assess the quality of the objects in the picture. Then, depending on the score shown in the screen in real-time, the person taking the picture can adjust something such as the camera's configuration parameters, the object's position, etc. In the oil and gas domain, the system could be similarly used to take pictures from places that are candidates for drilling wells, where in real-time the system can provide a score for the quality of pictures, based on models built from training images.

Figure 7:
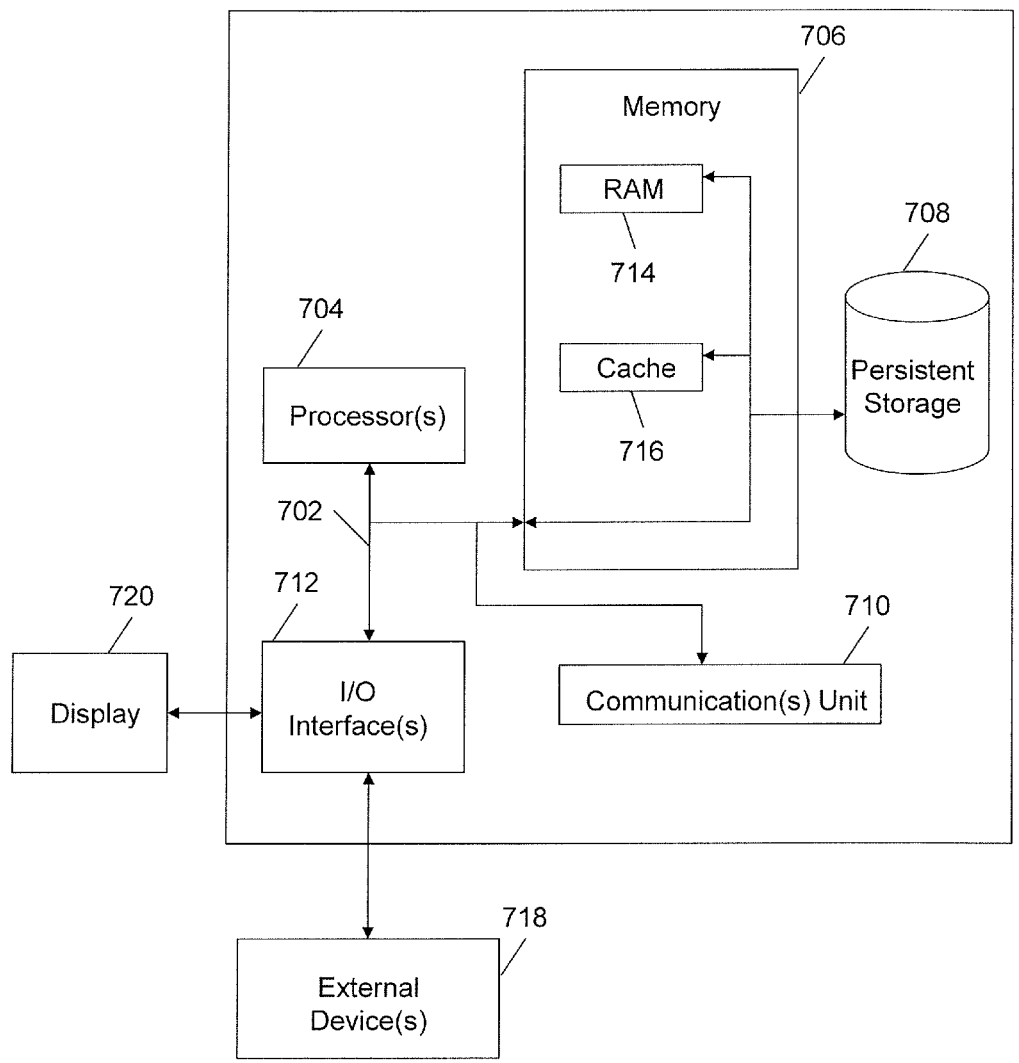
FIG. 7 illustrates an apparatus for implementing an exemplary embodiment of the present invention.

FIG. 7 depicts a block diagram of components of a computer on which the database 130 is stored or the image acquisition device 305, in accordance with an exemplary embodiment of the present invention. It should be appreciated that FIG. 7 provides only an illustration of one implementation, and does not imply any limitations with regard to the environments in which different embodiments may be implemented. Many modifications to the depicted environment may be made.

The computer on which the database 130 is stored or the image acquisition device 305 can include communications fabric 702, which provides communications between computer processor(s) 704, memory 706, persistent storage 708, communications unit 710, and input/output (I/O) interface(s) 712. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 706 and persistent storage 708 are computer readable storage media. In this embodiment, memory 706 includes random access memory (RAM) 714 and cache memory 716. In general, memory 706 can include any suitable volatile or non-volatile computer readable storage media.

The image database 130, supervised machine learning algorithms and models database 225 are stored in persistent storage 708 for execution and/or access by one or more of the respective computer processors 704 via one or more memories of memory 706. In this embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of persistent storage 708.

Communications unit 710, in these examples, provides for communications with other data processing systems or devices. In these examples, communications unit 710 may include one or more network interface cards. Communications unit 710 may provide communications through the use of either or both physical and wireless communications links. Information from social networks may be downloaded to persistent storage 708 through communications unit 710.

I/O interface(s) 712 allows for input and output of data with other devices that may be connected to the computer on which the database 130 is stored or the image acquisition device 305. For example, I/O interface 712 may provide a connection to external devices 718 such as a keyboard, keypad, a touch screen, and/or some other suitable input device. External devices 718 can also include portable computer readable storage media such as, for example, thumb drives, portable optical or magnetic disks, and memory cards. Software and data used to practice embodiments of the present invention, e.g., supervised machine learning algorithms, can be stored on such portable computer readable storage media and can be loaded onto persistent storage 708 via I/O interface(s) 712. I/O interface(s) 712 also connect to a display 720. Display 720 provides a mechanism to display data to a user and may be, for example, a computer monitor or an incorporated display screen, such as is used in tablet computers and smart phones.

The image acquisition device 305 in accordance with an exemplary embodiment of the present invention may include a digital image sensor that detects and conveys the information that constitutes an image. The image sensor maybe charge-coupled device (CCD) image sensor or a complementary metal-oxide-semiconductor (CMOS) image sensor, for example.

The image acquisition device 305 in accordance with an exemplary embodiment of the present invention may include an advanced mobile operating system which combines features of a personal computer operating system with other features useful for mobile or handheld use. For example, the image acquisition device 305 may combine the features of a cell phone with those of other mobile devices, such as personal digital assistant (PDA), a media player and a global positioning system (GPS) navigation unit.

The image acquisition device 305 in accordance with an exemplary embodiment of the present invention may include a radio frequency (RF) transceiver module to connect the image acquisition device 305 to the internet via a cellular network, or a WiFi/802.11 module to connect the image acquisition device 305 to the internet via a wireless local area network (WLAN).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A photographing method, comprising:
   displaying, on an image acquisition device, a scene that includes a first person;
   displaying, on the image acquisition device, a first score in the scene, wherein the first score corresponds to a first image in a database and the first image in the database was assigned the first score by the first person, the first score corresponding to how good the first person thinks they look in the first image in the database; and
   acquiring, with the image acquisition device, a photograph of the scene when the first score is equal to or greater than a threshold value,
   wherein the first score is obtained from a machine learning prediction applied to a trained model for the first person, wherein the model is built on training data containing a plurality of images of the first person, wherein each of the plurality of images is scored by the first person, the score corresponding to how good the first person thinks they look in the image.

2. The method of claim 1, further comprising:
identifying, at the image acquisition device, the first person in the scene;
receiving, at the image acquisition device, the trained model for the first person; and
determining, at the image acquisition device, the first score using the trained model for the first person.

3. The method of claim 2, wherein the trained model is wirelessly received by the image acquisition device.

4. The method of claim 1, further comprising:
identifying, at the image acquisition device, the first person in the scene with the image acquisition device; and
receiving, at the image acquisition device, the first score obtained using the trained model for the first person.

5. The method of claim 1, wherein when the scene includes a second person, the method further comprises:
displaying, on the image acquisition device, a second score in the scene, wherein the second score corresponds to a second image in the database and the second image in the database was assigned the second score by the second person, the second score corresponding to how good the second person thinks they look in the second image in the database; and
acquiring, with the image acquisition device, the photograph of the scene when the first and second scores are equal to or greater than a threshold value.

6. The method of claim 5, further comprising:
identifying, at the image acquisition device, the second person in the scene;
receiving, at the image acquisition device, a trained model for the second person; and
determining, at the image acquisition device, the second score using the trained model for the second person.

7. The method of claim 1, wherein the image acquisition device includes an image sensor.

8. A method of providing image quality scores when a picture is going to be taken with a camera, comprising:
displaying, on a screen of a photographing device, an image of a scene including a plurality of people;
identifying, with the photographing device, the identity of each person in the scene;
retrieving, from a database, an image quality prediction model for each person in the scene;
computing, at the photographing device, a score for each person in the scene, wherein the score for each person is computed using their image quality predication model and the score for each person corresponds to how good he or she looks in a corresponding image; and
taking, with the photographing device, a picture of the scene when the scores are above a threshold value, wherein an image quality prediction model for a person is built by:
extracting information from at least one social network for the person, wherein the information includes pictures of the person;
assigning scores to the pictures of the person, wherein for each picture, the scores are based on a number of likes given to the picture in the social network; and
applying a supervised machine learning algorithm to the scored pictures to learn a scoring function for the person.

9. The method of claim 8, wherein the screen of the photographing device is a viewfinder of a camera.

10. The method of claim 8, wherein the photographing device is a smartphone or a tablet computer.

11. The method of claim 8, wherein at least one of the person's score is adjusted based on a repositioning of the corresponding person in the scene.

12. The method of claim 11, wherein the score is increased or decreased when the person repositions himself or herself.

13. The method of claim 11, wherein the picture is taken after the at least one person's score has been adjusted.

14. A photographing method, comprising:
displaying, on an image acquisition device, a scene that includes a first element;
displaying, on the image acquisition device, a first score in the scene, wherein the first score corresponds to an image in a database and the image in the database was assigned the first score by a person, the first score corresponding to how good the person thinks the first element looks in the image in the database; and
acquiring, with the image acquisition device, a photograph of the scene when the first score is equal to or greater than a threshold value,
wherein the first score is obtained from a machine learning prediction applied to a trained model for the first element, wherein the model is built on training data containing a plurality of images of the first element, wherein each of the plurality of images is scored by the first person, the score corresponding to how good the first person thinks the first elements looks in the image.

15. The method of claim 14, wherein the first element is a physical object.

* * * * *